Patented Jan. 6, 1931

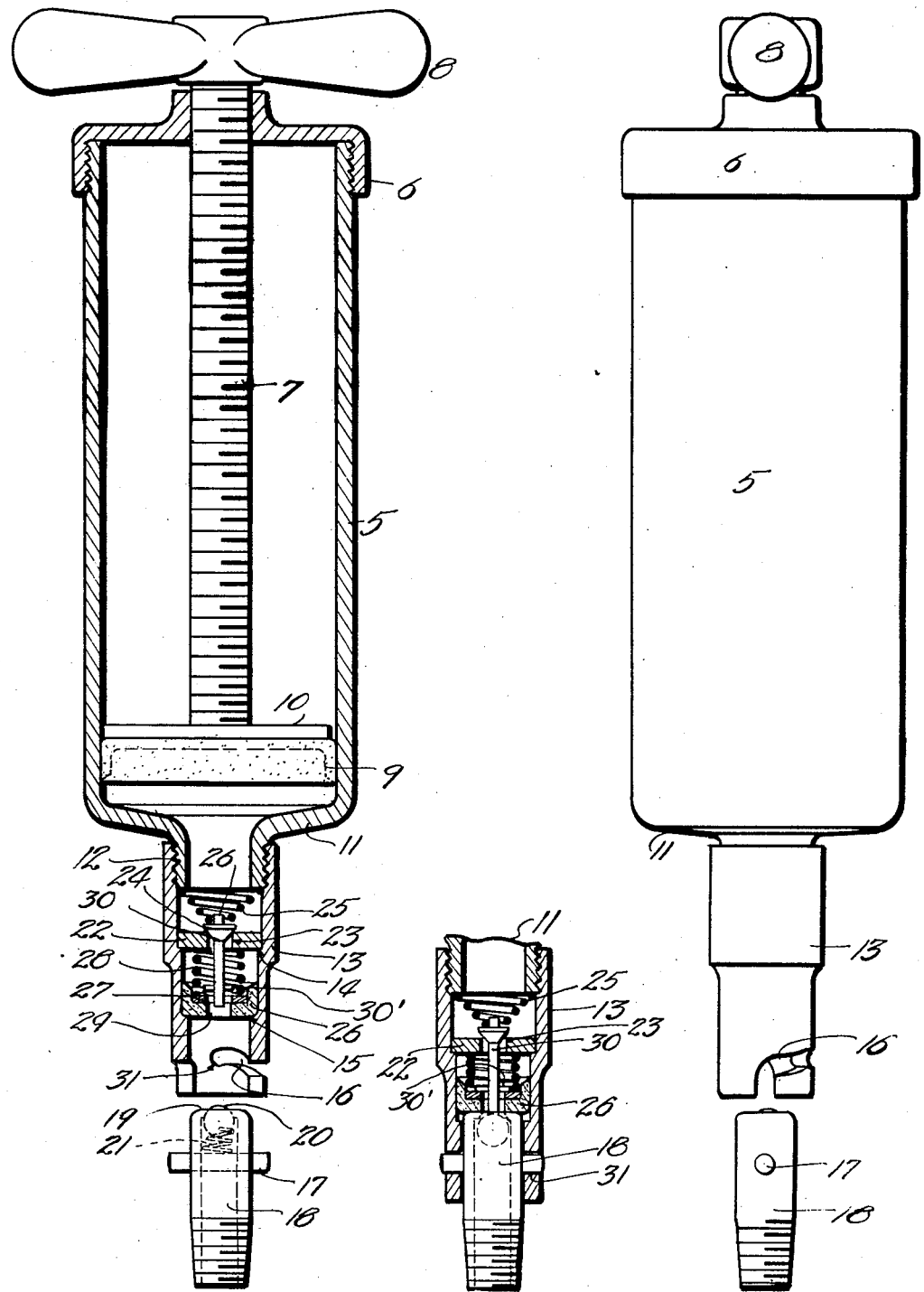

1,787,439

UNITED STATES PATENT OFFICE

DOUGLAS F. FESLER, OF CHICAGO, ILLINOIS, ASSIGNOR TO ALEMITE CORPORATION, OF CHICAGO, ILLINOIS, A CORPORATION OF DELAWARE

LUBRICATING SYSTEM

Application filed July 20, 1922. Serial No. 576,181.

My invention relates to improvements in lubricating systems, and is particularly concerned with improvements in that type of lubricating system comprising a plurality of fittings or nipples, each of which is adapted to be secured to a bearing to be lubricated, and a common lubricant compressor for supplying lubricant to each of said fittings or nipples under high pressure.

The objects of my present invention are:

First, to provide a lubricating system of the character described comprising a compressor having means for successively making detachable connections with the nipples, the connection between the compressor and the nipple being sealed so that lubricant under very high pressure can be forced into the nipple without leakage;

Second, to provide a lubricating system comprising a compressor having a discharge conduit which is provided with a valve for preventing the escape of lubricant from the compressor except when the compressor is attached to a nipple;

Third, to provide a lubricating system such as described in which the act of coupling or connecting the compressor with the nipple automatically opens the valve;

Fourth, to provide a system such as described in which an initial seal between the compressor and nipple is created before the lubricant is permitted to escape from the compressor, thereby preventing leakage of the lubricant at the joint between the compressor and the nipple;

Fifth, to provide a lubricating system in which the pressure on the lubricant can be produced either before or after the compressor is connected with the nipple, and Finally, to provide a lubricating system of the character described which is simple in construction and economical to manufacture.

Other objects will appear as this description progresses, reference being had to the accompanying drawings in which Figure 1 is a side elevation of one embodiment of my invention, this figure showing the compressor and nipple in detached relation;

Figure 2 is a central longitudinal section through the compressor forming a part of my improved lubricating system, the nipple being shown in side elevation, and Figure 3 is a detail section similar to Figure 2 but showing the relation of the parts when the compressor is connected with a nipple.

Throughout the several views, similar reference characters will be used for referring to similar parts.

Referring to the drawings wherein I have illustrated one embodiment of my invention, the reference character 5 indicates the barrel of a compressor having a detachable cap 6 at one end, into which is threaded the piston rod 7, the outer end of which is provided with a suitable handle 8, and the inner end of which carries a piston comprising a cup leather 9 and the metal follower disc 10. The end of the barrel opposite the cap 6 is provided with an integral closure 11 which terminates in a threaded hollow boss 12 forming the outlet of the barrel.

Secured to the boss 12 is a tube or sleeve 13 forming the discharge conduit of the compressor. The diameter of the bore of the tube or sleeve 13 is successively reduced toward the outer end of the sleeve forming the shoulders 14 and 15, and the outer end of the tube has formed therein oppositely disposed bayonet slots 16 which are adapted to receive the ends of the pin 17 which extend outwardly from the tubular portion 18 of the nipple. The outer end of the nipple 18 is flanged over, as indicated at 19, to form a valve seat for the ball closure 20 which is yieldingly held in closed position by a compression spring 21 interposed between the ball and the pin 17. There is nothing novel about the construction of the nipple just described.

A disc 22 is seated upon the shoulder 14 and is provided with the central aperture or opening 23 forming a valve seat for the tapered valve 24. The spiral spring 25 interposed between the inner side of the valve 24 and the adjacent end of the hollow boss 12 provides means for yieldingly holding the valve on its seat. A protuberance 26 extending inwardly from the valve centers the outer end of the spring 24 with reference to the valve.

A flexible gasket comprising the cup leather 26 and the washer 27 is slidably mounted in that portion of the bore of the sleeve 13 between the shoulders 14 and 15, and is yieldingly held against the latter by means of a compression spring 28 interposed between the disc 22 and the washer 27. The cup leather is provided with an opening 29 which registers with the opening in the washer 27, and also registers with the opening in the nipple when the nipple and sleeve are brought into co-acting relation, as shown in Figure 3.

The valve 24 has an outwardly extending stem 30 which is smaller in diameter than the openings in the disc 22, the washer 27 and the gasket 29, so as to provide clearance between the sides of these openings and the valve stem for the passage of lubricant. The outer end of this stem projects to a position, as shown in Figure 2, which is slightly inwardly beyond the outer face of the cup leather 26, and is provided with a transversely extending pin 30', the ends of which project beyond the valve stem and over the inner side of the washer 27, this pin being spaced inwardly from the inner face of the washer 27 when the gasket 26 rests upon the shoulder 15, as shown in Figure 2.

In operation, when it is desired to force lubricant into one of the nipples 18, the sleeve 13 of the compressor is brought into position to receive the nipple 18, and by then turning the barrel of the compressor, the lower edges of the bayonet slot 16, which are inclined inwardly, act as cams upon the pins 17 to draw the sleeve downwardly over the nipple.

The relation between the distance from the lower side of the pin 17 to the outer end of the nipple 18, and the distance between the lower edge of the bayonet slot 16 and the outer face of the cup leather 26, is such that when the pin 17 begins to ride upon the inclined portion of the outer edge of the slot 16, the end 19 of the nipple engages the outer face of the cup leather or gasket 26 and further rotation of the compressor barrel causes the nipple to move into the tube or sleeve 13 and raise the gasket against the tensional spring 28, thereby establishing an initial seal which tends to prevent the escape of lubricant between the gasket and the end of the nipple. Continued rotation of the compressor barrel relative to the nipple causes the pin 17 to ride inwardly still farther on the cam surface of the edge of the slot 16, thereby bringing the inner face of the washer 26 into contact with the outwardly extending ends of the pin 30', thus pushing the valve stem 30 inwardly and moving the valve 24 away from its seat. If the rotation is continued still further, the ends of the pin 17 drop into the slight depressions 31 formed in the outer edge of the bayonet slot. This permits the valve to move outwardly slightly, but not sufficient to close it on its seat.

In the use of my improved lubricating system, the lubricant can be compressed in the compressor before the compressor is attached to the nipple, or afterward, if desired. In either event, whenever the lubricant is under pressure and the compressor is attached to the nipple, as described above, the lubricant will flow outwardly through the opening of the disc 22 and the openings in the washer 27 and the gasket 26, and into the nipple, the pressure of the lubricant being sufficient to open the valve or closure 20 against the tension of its spring 21, or, if desired, the end of the valve stem 30 can be caused to project outwardly sufficient to engage the closure 20 and open it. If this construction is used, that is, if the valve stem 30 is intended to be used to open the closure 20, then the spring 25 should be somewhat stiffer than the spring 21.

To remove the compressor from the nipple, it is rotated in the direction opposite to the direction in which it was rotated to connect it with the nipple. The first part of this initial rotation in which the pins move out of the depressions 31 causes the valve 30 to open slightly wider, but thereafter as the compressor continues to be rotated, the valve will gradually close under the tension of the spring 25, and after the valve is closed, further rotation of the compressor causes the compressor to move outwardly away from the end of the nipple 18 until the inner end of the nipple is free from contact with the outer face of the gasket 26, whereupon the compressor can be removed from the nipple.

From the above description, it will be clear that in connecting the compressor with the nipple, there is established an initial seal between the end of the nipple and the gasket 26 before the valve is opened, that is, before the pressure of the lubricant is imposed upon the joint between the nipple and the gasket 26. This initial seal prevents any escape of lubricant between the nipple and the gasket, and then as the lubricant under pressure passes to the nipple, the pressure on the inner side of the gasket will force the gasket against the end of the nipple with increase in pressure on the lubricant. It will also be seen that in detaching the compressor from the nipple, the valve is first closed, thus relieving the joint between the nipple and the gasket 26 from the extremely high pressure of the lubricant, but that the seal between the gasket and the nipple is not broken until the gasket reaches the limit of its outward movement under the tension of the spring 28. This arrangement insures an effectual seal between the compressor and the nipple, and thus prevents leakage between these two members.

When the ends of the pins 17 are seated in the depressions 31 and the lubricant is under pressure, this pressure tends to hold the ends of the pins 17 in these depressions and thus to lock the compressor to the nipple, so that there is very little chance of the compressor accidentally becoming detached from the nipple while the compressor is being operated to place additional pressure upon the lubricant.

While I have described the details of construction of the preferred embodiment of my invention, it is to be clearly understood that my invention is not to be limited to these details of construction, but is capable of other adaptations and modifications within the scope of the appended claims.

Having thus described my invention, what I claim is:

1. A lubricant compressor comprising a barrel having a rigid discharge conduit, the outer end of which is provided with an inclined bayonet slot, a disc mounted in said discharge conduit and having an opening forming a valve seat, an inwardly opening valve co-acting with said valve seat, a spring yieldingly holding said valve on its seat, a flexible gasket in the outer end of said discharge conduit, said gasket having a central opening, means for limiting the outward movement of said gasket, a spring interposed between said gasket and said disc, said valve having an outwardly extending valve stem smaller than the opening in said gasket and registering therewith, said valve stem terminating inwardly beyond the outer side of said gasket, and comprising means for opening the inlet valve of a lubricant-receiving nipple.

2. A lubricant compressor comprising a barrel having a rigid discharge conduit, the outer end of which is provided with an inclined bayonet slot, a disc mounted in said discharge conduit and having an opening forming a valve seat, an inwardly opening valve coacting with said valve seat, a flexible gasket in the outer end of said discharge conduit, said gasket having an opening, and means for limiting the outward movement of said gasket, said valve having an outwardly extending valve stem smaller than the opening in said gasket and registering therewith, said valve stem terminating inwardly beyond the outer side of said gasket, and comprising means for opening the inlet valve of a lubricant receiving nipple.

3. A lubricant compressor comprising a barrel having a rigid discharge conduit, the outer end of which is provided with an inclined bayonet slot, a disc mounted in said discharge conduit and having an opening forming a valve seat, an inwardly opening valve co-acting with said valve seat, a flexible gasket in the outer end of said discharge conduit, said gasket having an opening, and means for limiting the outward movement of said gasket, said valve having an outwardly extending valve stem terminating inwardly beyond the outer side of said gasket and comprising means for opening the inlet valve of a lubricant-receiving nipple.

4. The combination of a pressure creating means, a member connected thereto and having a chamber therein and a transversely arranged sealing member in said chamber having a central port therethrough, a check valve positioned above said sealing member, and a spring exerting downward tension at all times on said check valve, the latter having a pendant stem adapted to contact with the top of a pin fitting.

5. The combination of a pressure creating means, a member connected thereto and having a chamber therein and a transversely arranged sealing member in said chamber, said member having a central port therethrough, a pin fitting, a bayonet joint connection common to said pin fitting and member, a downwardly seating check valve above said sealing member, and a spring exerting downward tension on said check valve, the latter having a pendant stem passing through said sealing member out of connection therewith and adapted to contact with the top of said pin fitting, said spring causing members of the said bayonet joint connection to be held in frictional engagement when interlocked.

In witness whereof, I hereunto subscribe my name this 27th day of June, 1922.

DOUGLAS F. FESLER.